(12) United States Patent
Doi

(10) Patent No.: US 9,890,516 B2
(45) Date of Patent: Feb. 13, 2018

(54) REVOLVING DEVICE FOR WORK VEHICLE, AND METHOD FOR MANUFACTURING SAME

(71) Applicant: KOMATSU LTD., Tokyo (JP)

(72) Inventor: Shunji Doi, Hirakata (JP)

(73) Assignee: KOMATSU LTD., Tokyo (JP)

( * ) Notice: Subject to any disclaimer, the term of this patent is extended or adjusted under 35 U.S.C. 154(b) by 868 days.

(21) Appl. No.: 14/365,679

(22) PCT Filed: Mar. 27, 2014

(86) PCT No.: PCT/JP2014/059013
§ 371 (c)(1),
(2) Date: Jun. 16, 2014

(87) PCT Pub. No.: WO2015/145695
PCT Pub. Date: Oct. 1, 2015

(65) Prior Publication Data
US 2016/0340864 A1 Nov. 24, 2016

(51) Int. Cl.
*E02F 9/12* (2006.01)
*F16C 33/78* (2006.01)
(Continued)

(52) U.S. Cl.
CPC .............. *E02F 9/121* (2013.01); *E02F 9/123* (2013.01); *F16C 19/26* (2013.01);
(Continued)

(58) Field of Classification Search
CPC ... E02F 9/10; E02F 9/121; E02F 9/123; F16C 33/72; F16C 33/723; F16C 33/726;
(Continued)

(56) References Cited

U.S. PATENT DOCUMENTS 3,049,357 A    8/1962   Kosatka
3,813,102 A * 5/1974   Derman .................. F16B 21/18
                                                                                             277/397
(Continued)

FOREIGN PATENT DOCUMENTS

JP            9-21142 A    1/1997
JP    2008-133871 A    6/2008
(Continued)

OTHER PUBLICATIONS

The International Search Report for the corresponding international application No. PCT/JP2014/059013, dated Aug. 7, 2014.
(Continued)

*Primary Examiner* — Terence Boes
*Assistant Examiner* — Bobby Rushing, Jr.
(74) *Attorney, Agent, or Firm* — Global IP Counselors, LLP

(57) ABSTRACT

The revolving device for a work vehicle is such that a support ring is disposed on the second pinion shaft at a position between an output pinion and a second bearing component, and comes into contact with the second bearing component and the output pinion to support the output pinion above the second bearing component. A seal member has a mounting component that is disposed on the outer peripheral face of the support ring, and a lip component that is formed protruding outward in the radial direction from the mounting component and seals the upper side of the second bearing component. The support ring has a protrusion protruding outward in the radial direction from the lower end of the support ring. The mounting component is disposed higher than the protrusion, and the lip component protrudes further outside than the protrusion.

5 Claims, 13 Drawing Sheets

(51) Int. Cl.
*F16C 19/26* (2006.01)
*F16H 57/021* (2012.01)

(52) U.S. Cl.
CPC ...... *F16C 33/7823* (2013.01); *F16C 33/7886* (2013.01); *F16H 57/021* (2013.01); *F16C 2350/26* (2013.01)

(58) Field of Classification Search
CPC   F16C 33/782; F16C 33/7823; F16C 33/7886; F16C 2350/26; F16C 33/7826; F16C 33/7889; F16C 33/7809; F16C 33/783; F16C 33/76; F16C 33/78; F16H 57/021; F16H 57/023
USPC ......... 384/94, 119, 130, 147, 148, 447, 484, 384/489, 607; 414/695.8; 277/348–353, 277/357, 402, 403, 549, 551, 572; 74/438, 412 R, 413, 414
See application file for complete search history.

(56) References Cited

U.S. PATENT DOCUMENTS

| | | | | |
|---|---|---|---|---|
| 5,017,024 A * | 5/1991 | Clark | ................ | F16C 33/7886 277/402 |
| 5,054,329 A * | 10/1991 | Morishita | ............... | F02N 15/00 277/577 |
| 5,172,917 A * | 12/1992 | du Gay | ................ | F16J 15/3456 277/402 |
| 5,259,628 A * | 11/1993 | Nisley | ..................... | F16C 33/76 277/348 |
| 5,388,916 A * | 2/1995 | Ohtsuki | ................ | F16C 19/185 384/448 |
| 6,062,734 A * | 5/2000 | Bundgart | ............ | F16C 33/7886 277/551 |
| 6,845,681 B2 * | 1/2005 | Murata | ................... | F02N 15/06 277/490 |
| 9,546,684 B2 * | 1/2017 | Back | .................. | F16C 33/7806 |
| 2008/0124015 A1 | 5/2008 | Fujiwara et al. | | |
| 2008/0264202 A1 * | 10/2008 | Mineshima | ............. | F16H 1/145 74/606 R |

FOREIGN PATENT DOCUMENTS

| | | |
|---|---|---|
| JP | 5386627 B1 | 10/2013 |
| JP | 5386627 B1 | 1/2014 |
| JP | 5405649 B1 | 2/2014 |
| JP | 112012002808 B4 * | 6/2015 ............. F01M 11/12 |

OTHER PUBLICATIONS

The International Search Report for the corresponding international application No. PCT/JP2014/059013, dated Jul. 8, 2014.

* cited by examiner

REVOLVING DEVICE FOR WORK VEHICLE, AND METHOD FOR MANUFACTURING SAME

CROSS-REFERENCE TO RELATED APPLICATIONS

This application is a U.S. National stage application of International Application No. PCT/JP2014/059013, filed on Mar. 27, 2014.

BACKGROUND

Field of the Invention

The present invention relates to a revolving device for a work vehicle, and to a method for manufacturing the same.

Description of the Related Art

A work vehicle, such as a hydraulic excavator, is provided with a lower traveling unit that has a crawler belt, and an upper structure that has a work implement, etc. The work implement in the case of a hydraulic excavator, for example, consists of a boom, an arm, a bucket, etc.

Swing machinery equipped with a swing motor is provided as a revolving device to the upper structure to make the upper structure revolve with respect to the lower traveling unit. Meanwhile, a swing circle is provided to the lower traveling unit. The swing machinery is provided with a speed reduction unit for reducing the rotational drive force from the swing motor, a brake unit, an output pinion, and so forth, and the output pinion meshes with teeth provided on the inside or outside of the swing circle. The rotational drive force of the swing motor is transmitted to the output pinion, and the swing machinery rotationally moves on the inside or outside of the swing circle, thereby causing the upper structure to revolve with respect to the lower traveling unit.

When swing machinery thus configured is used in a large hydraulic excavator or the like, first and second pinion shafts are provided above and below the output pinion, and first and second bearing components are provided to the first and second pinion shafts, respectively (see Japanese Patent No. 5,386,627, for example).

The second bearing component disposed on the lower side of the output pinion is covered by a case from below, and this case is filled with grease for lubricating the bearing. Meanwhile, the case does not cover the part above the second bearing component, so a seal member is provided to the upper side of the second bearing component to prevent the scattering of grease from above to the outside, and to prevent dirt, water, or the like from coming in from above.

SUMMARY

However, the following problems have been encountered with the above-mentioned conventional revolving device for a work vehicle. When this revolving device is manufactured, the seal member sometimes underwent elastic deformation when it was attached around the second pinion shaft, and this changed the angle of the lip component. Also, the case covering the second bearing component made it impossible to visually check the state of contact of the seal member during manufacture.

Therefore, when the angle of the lip component changes dramatically, the lip component of the seal member may not be disposed in the proper position of the revolving device after manufacture, resulting in a loss of sealing performance.

In light of the problems encountered with conventional revolving devices for a work vehicle, it is an object of the present invention to provide a revolving device for a work vehicle with which good sealing performance can be ensured more reliably, as well as a method for manufacturing this revolving device.

The revolving device for a work vehicle pertaining to a first exemplary embodiment of the present invention comprises a driving apparatus, a speed reduction unit, an output pinion, a first pinion shaft, a second pinion shaft, a case, a support ring, and a seal member. The driving apparatus generates a rotational drive force for revolution. The speed reduction unit is disposed under the driving apparatus and reduces the speed of rotation of the driving apparatus. The output pinion is disposed under the speed reduction unit and outputs the rotation of the driving apparatus reduced by the speed reduction unit. The first pinion shaft is provided facing upward from the top face of the output pinion and transmits the rotation of the driving apparatus through the speed reduction unit. The second pinion shaft is provided facing downward from the bottom face of the output pinion. The bearing component rotatably supports the second pinion shaft. The case is provided to cover the lower side and the surrounding area of the bearing component. The support ring is disposed on the second pinion shaft at a position between the output pinion and the bearing component, and comes into contact with the bearing component and the output pinion to support the output pinion above the bearing component. The seal member has a mounting component disposed around the outside of the support ring, and a lip component that is formed protruding outward in the radial direction from the mounting component and seals the upper side of the bearing component. The support ring has a protrusion provided protruding outward in the radial direction from the lower end of the support ring. The mounting component is disposed higher than the protrusion, and the lip component protrudes more to the outside than the protrusion.

In the manufacture of a revolving device for a work vehicle, a seal member is fitted around the outside of a support ring, but because the seal member is elastic, it may undergo elastic deformation, causing the angle of the lip component to change. When a protrusion is provided as above, however, then the lip component will hit the protrusion, reducing the angle change, even though the angle of the lip component changes.

Accordingly, even when the case precludes visual inspection, the lip component of the seal member can still be disposed in the proper position. This means that good sealing performance can be ensured more reliably.

The revolving device for a work vehicle pertaining to a second exemplary embodiment of the present invention is the revolving device for a work vehicle pertaining to the first invention, wherein the bearing component has an inner ring, an outer ring, and a rolling body. The inner ring comes into contact with the second pinion shaft and rotates along with the second pinion shaft. The outer ring is disposed on the outer peripheral side of the inner ring and is fixed to the case. The rolling body is disposed rollably between the inner ring and the outer ring. The lip component comes into contact with the upper end face of the outer ring.

Because the lip component of the seal member thus comes into contact with the upper end face of the outer ring, the upper side of the bearing component, and particularly the area between the outer ring and the inner ring, can be covered and sealed by the support ring and the seal member, which prevents the scattering of grease and infiltration of foreign matter.

The revolving device for a work vehicle pertaining to a third exemplary embodiment of the present invention is the revolving device for a work vehicle pertaining to the first exemplary embodiment of the present invention, wherein the protrusion is provided all the way around the support ring.

Consequently, a change in the angle of the lip component caused by fitting the seal member to the support ring can be suppressed all the way around, and the position sealed by the lip component can be set in the proper position.

The method for manufacturing a revolving device for a work vehicle pertaining to a fourth exemplary embodiment of the present invention is a method for manufacturing the revolving device for a work vehicle pertaining to the second exemplary embodiment of the present invention, comprising a first unit assembly step, a second unit assembly step, and a mounting step. The first unit assembly step involves assembling a first unit which has a speed reduction unit, a first pinion shaft, an output pinion, a second pinion shaft, a support ring, a seal member, and an inner ring. The first unit assembly step has a first attachment operation and a second attachment operation. In the first unit assembly step, the support ring, the seal member and the inner ring are attached around the second pinion shaft. In the second attachment operation, the first pinion shaft, the output pinion, and the second pinion shaft are attached to the speed reduction unit. The second unit assembly step involves assembling a second unit by attaching an outer ring and a rolling body to a case. The mounting step involves mounting the second unit, which is disposed upside-down, from the upper side of the first unit, which is disposed upside-down, so that the outer ring will be disposed on the outside of the inner ring. The diameter of the distal end of the protrusion is smaller than the inside diameter of the outer ring, and the diameter of the distal end of the lip component is larger than the inside diameter of the outer ring in a state of having been attached around the support ring.

Thus, when the seal member is attached around the support ring, even when there is a change in the angle of the lip component, the lip component will hit the protrusion, which suppresses a change in the angle, so the diameter of the distal end of the lip component will be larger than the inside diameter of the outer ring. Accordingly, in the mounting step, even if the case makes it impossible to visually inspect the contact state of the seal member, the lip component can be more reliably brought into contact with the upper end face of the outer ring, and good sealing performance can be ensured.

The present invention provides a revolving device for a work vehicle with which good sealing performance can be more reliably ensured, as well as a method for manufacturing this revolving device.

DETAILED DESCRIPTION OF EXEMPLARY EMBODIMENTS

Figure 1:
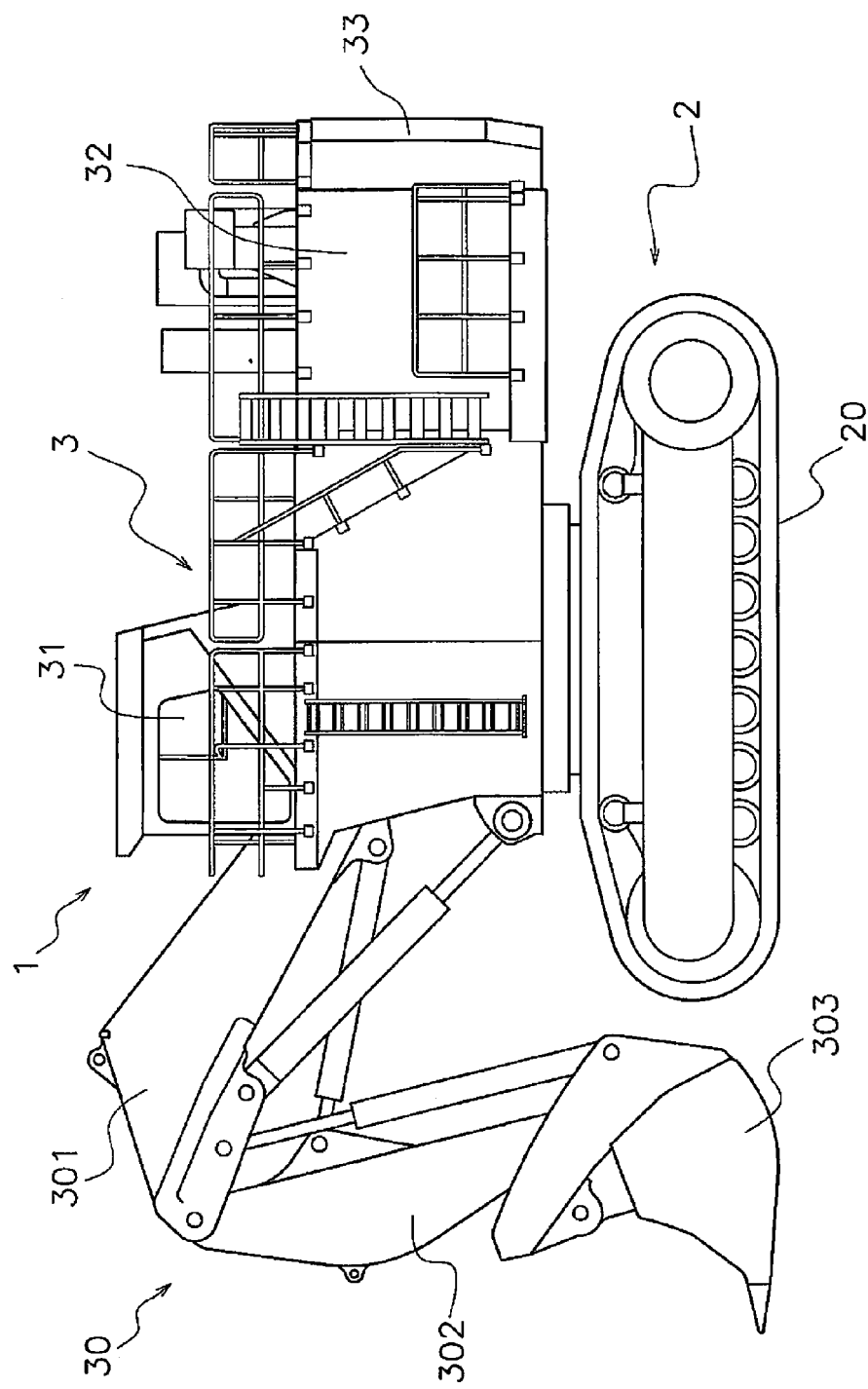
FIG. 1 is a side view of a hydraulic excavator pertaining to an exemplary embodiment of the present invention.
Figure 2:
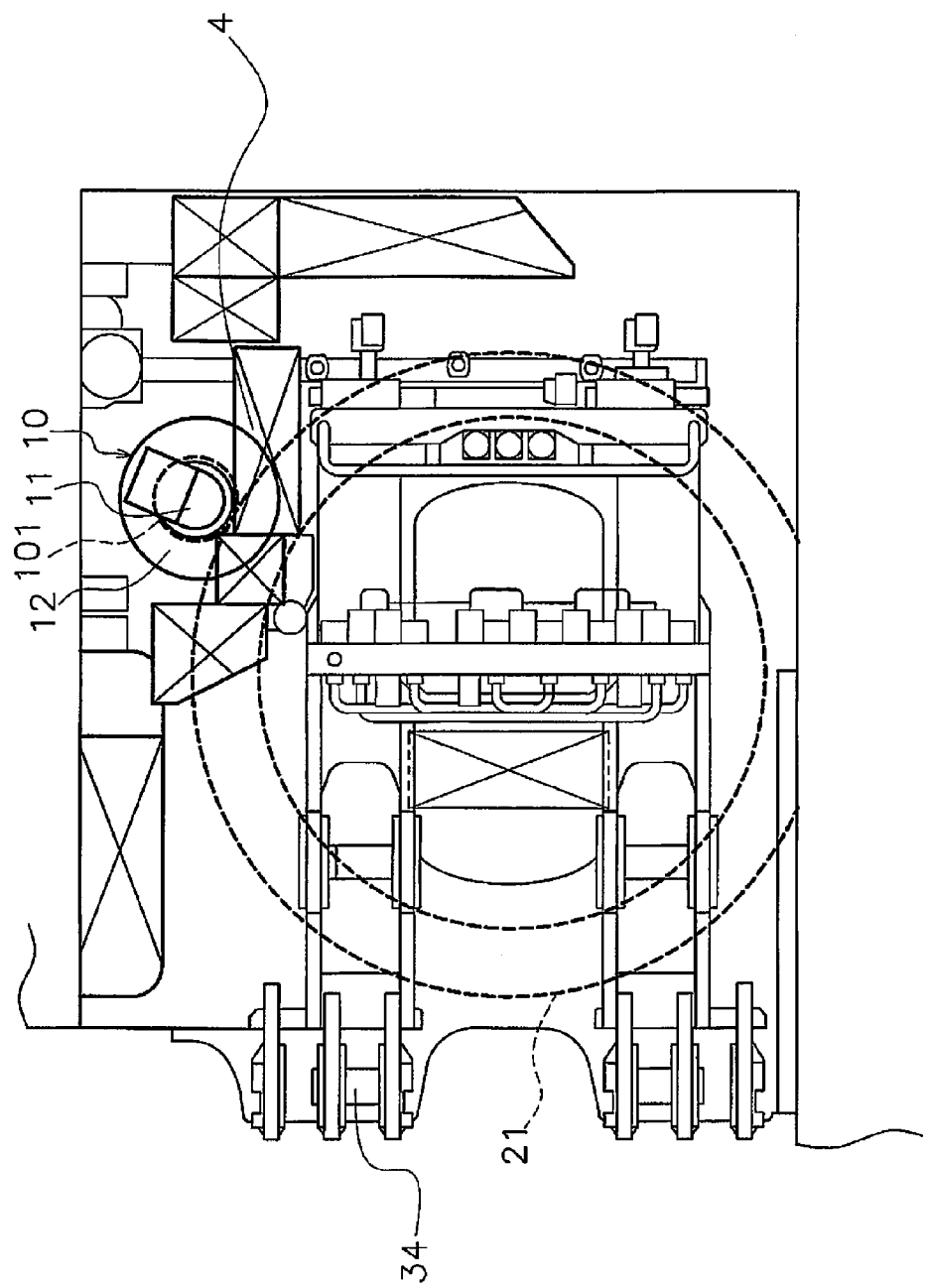
FIG. 2 is a plan view of the main components of the hydraulic excavator in FIG. 2.

The revolving device for a work vehicle pertaining to an exemplary embodiment of the present invention will now be described through reference to the drawings.
Configuration FIG. 1 is a side view of a hydraulic excavator pertaining to an exemplary embodiment. FIG. 2 is a plan view of the hydraulic excavator in this exemplary embodiment, other than the work implement.

As shown in FIG. 1, a hydraulic excavator 1 (an example of a work vehicle) comprises a lower traveling unit 2 that has crawler belts 20 provided at the left and right ends in the travel direction, and an upper structure 3 disposed at the upper part of the lower traveling unit 2. A work implement 30, an operator cab 31, an engine compartment 32, a counterweight 33, and so forth are provided to the upper structure 3. This work implement 30 has a boom 301 that is bent in the middle portion, an arm 302 that is attached to the distal end of the boom 301, and a bucket 303 that is attached to the distal end of the arm 302. As shown in FIG. 2, a work implement support shaft 34 is provided for attaching the work implement 30.

As shown in FIG. 2, a revolving device 10 is provided to the upper structure 3 to make the upper structure 3 revolve with respect to the lower traveling unit 2. A passage 4 is provided around the upper structure 3. This passage 4 allows workers to safely access the various portions of the hydraulic excavator 1 for maintenance and other purposes.
Structure of Revolving Device 10

Figure 3:
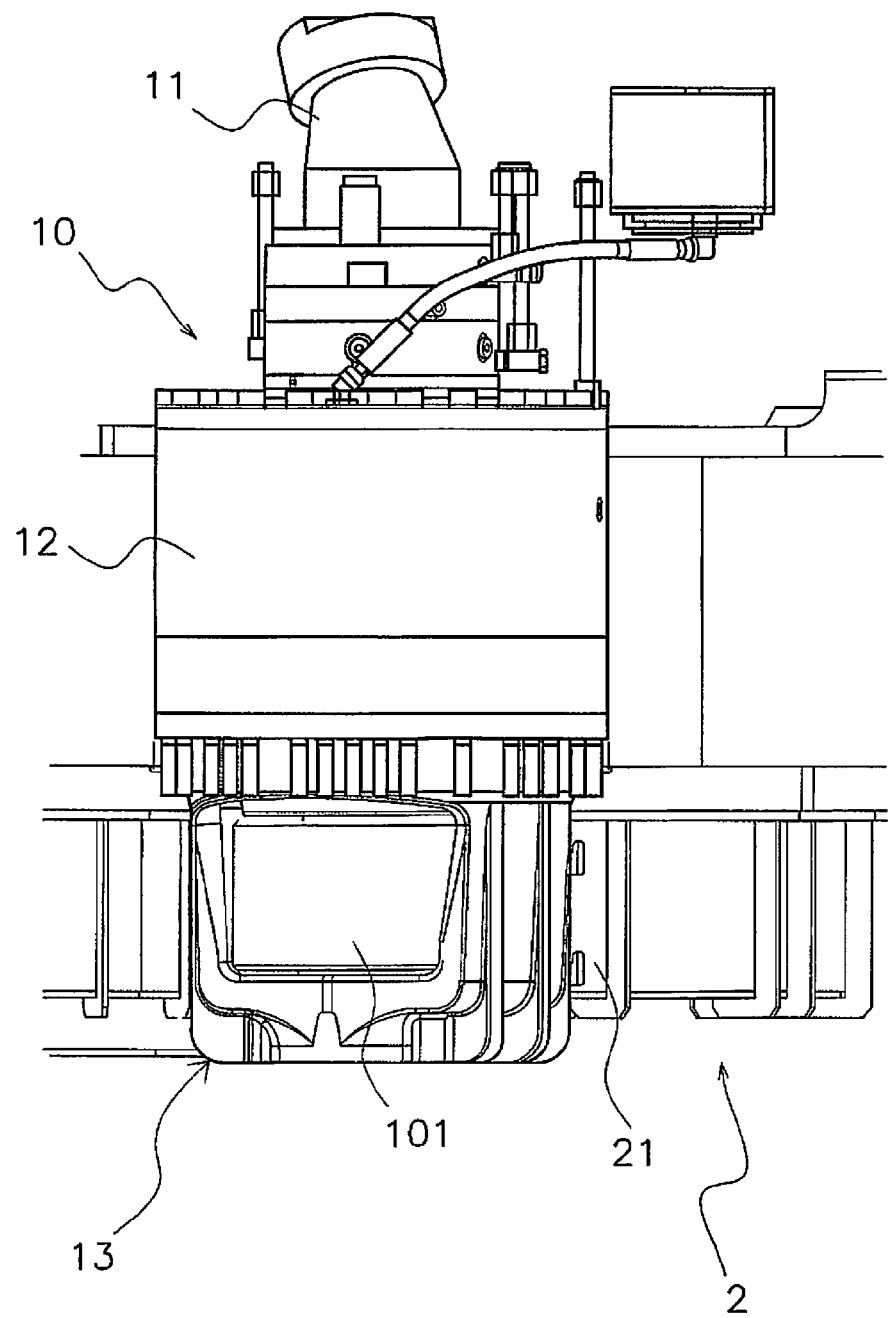
FIG. 3 is a diagram of the exterior of the revolving device of the hydraulic excavator in FIG. 1.

FIG. 3 is a side view of the revolving device 10 in this exemplary embodiment. As shown in FIGS. 2 and 3, the revolving device 10 of the upper structure 3 comprises a driving apparatus 11 provided at the upper part, swing machinery 12 provided to the lower side of the driving apparatus 11, and an output unit 13 provided to the lower side of the swing machinery 12 to output motive power inputted from the driving apparatus 11. A swing motor (hydraulic motor), control valves for controlling the hydraulic motor, and so forth are disposed in this driving apparatus 11.

As shown in FIGS. 2 and 3, a swing circle 21 having teeth around its outside is provided to the lower traveling unit 2, and an output pinion 101 provided to the output unit 13 meshes with the swing circle 21.

The rotational speed of the swing motor is reduced by a speed reduction unit disposed in the interior of the swing machinery 12, and then transmitted to the output pinion 101, causing the output pinion 101 to rotate. This rotation causes the revolving device 10 to rate around the outside of the swing circle 21, and causes the upper structure 3, which is fixed to the revolving device 10, to revolve with respect to the lower traveling unit 2.

Figure 4:
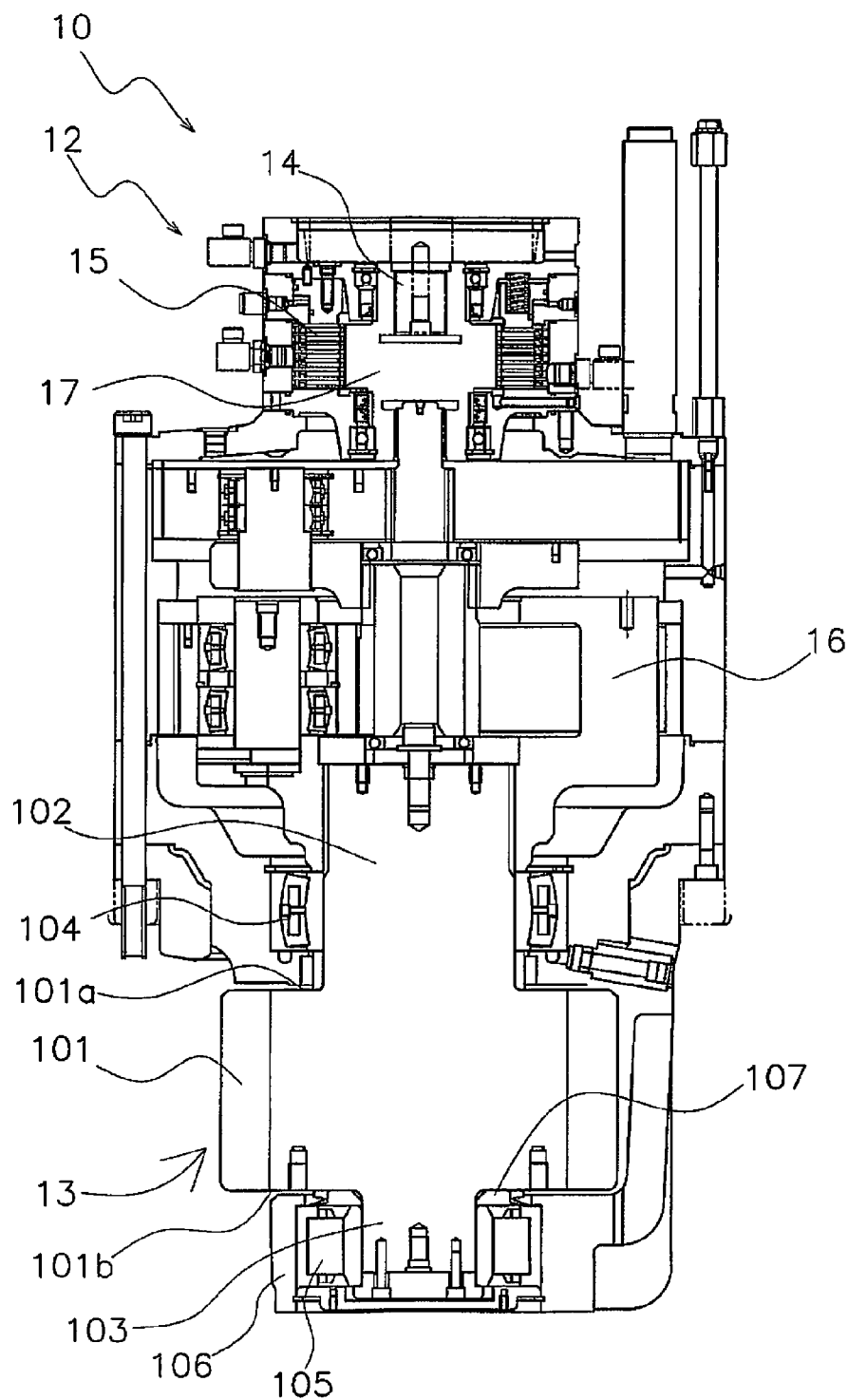
FIG. 4 is a diagram of the internal configuration of the revolving device in FIG. 3.

FIG. 4 is a cross section of the main components of the revolving device 10, with this cross section showing the main components of the swing machinery 12 and the output unit 13.

As shown in FIG. 4, a shaft linking component 14, a brake unit 15, and a speed reduction unit 16 are continuously provided, from top to bottom, to the swing machinery 12.

The shaft linking component 14 performs mechanical linkage of a swing motor disposed in the driving apparatus 11 with a driveshaft 17 of the swing machinery 12. The brake unit 15 brakes the rotation of the driveshaft 17. The speed reduction unit 16 uses an internal reduction mechanism to slow the rotation of the driveshaft 17 and output it to the output pinion 101.

Thus, in one example of the revolving device 10, the driving apparatus 11 including control valves and a swing motor, the swing machinery 12 including the shaft linking component 14, the brake unit 15, and the speed reduction unit 16, and the output unit 13 are disposed continuously in the vertical direction, from top to bottom.

Output Unit 13

The output unit 13 has the output pinion 101, a first pinion shaft 102, a second pinion shaft 103, a first bearing component 104, a second bearing component 105, a case 106, a support ring 107, and a seal member 108 (see FIG. 5; discussed below).

The output pinion 101 has its rotational axis in the up and down direction, and meshes with the swing circle 21.

The first pinion shaft 102 is provided facing upward from the top face 101a of the output pinion 101. The second pinion shaft 103 is provided facing downward from the bottom face 101b of the output pinion 101. The output pinion 101 rotates integrally and uses the first pinion shaft 102 and the second pinion shaft 103 as rotational shafts.

The first bearing component 104 rotatably supports the first pinion shaft 102. The second bearing component 105 rotatably supports the second pinion shaft 103. That is, the output pinion 101 is axially supported at both its upper and lower sides.

The case 106 is formed to cover the lower side and the area around the second bearing component 105. The case 106 is filled with grease for lubricating the second bearing component 105.

Figure 5:
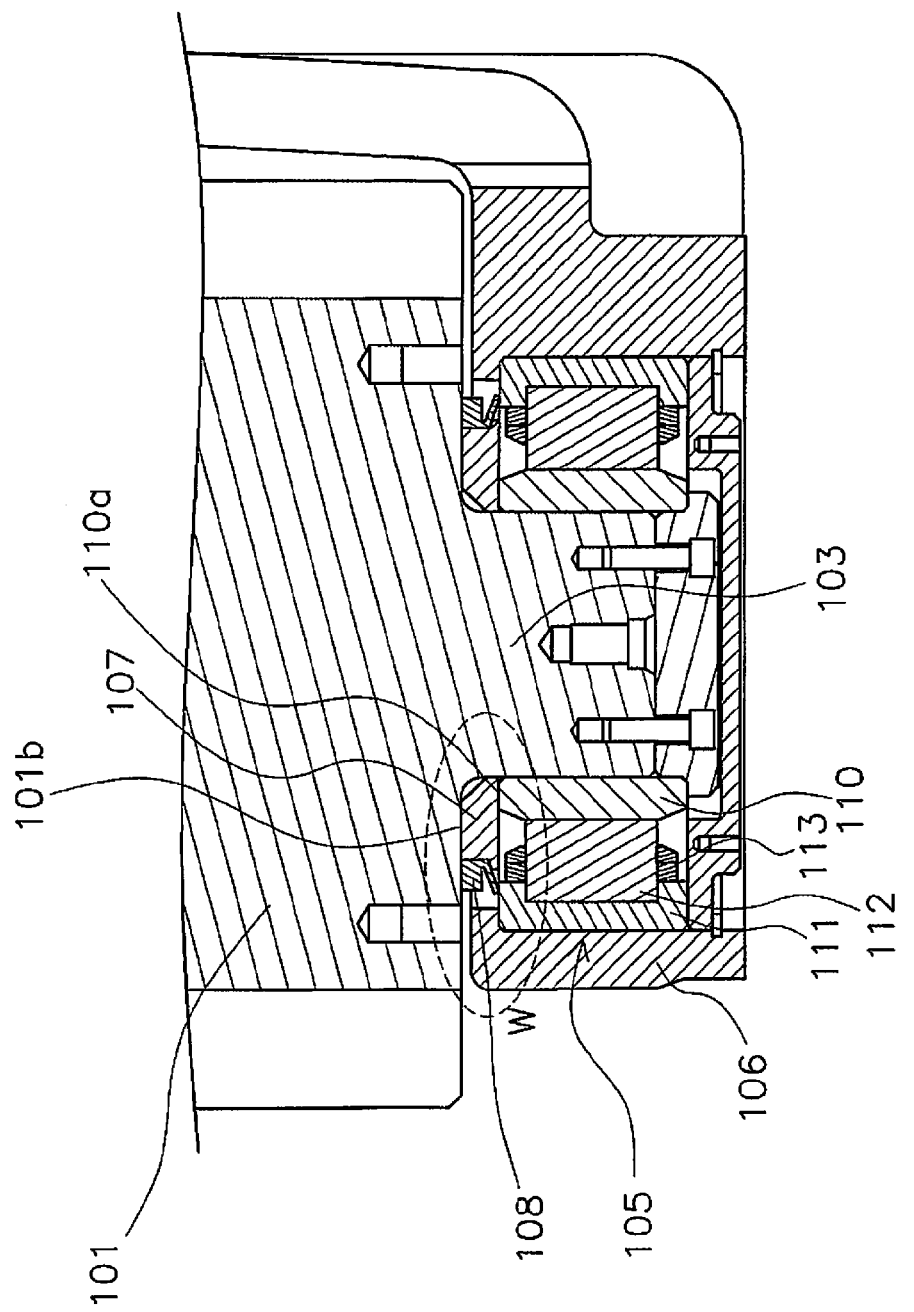
FIG. 5 is a detail view of the revolving device in FIG. 4.
Figure 6:
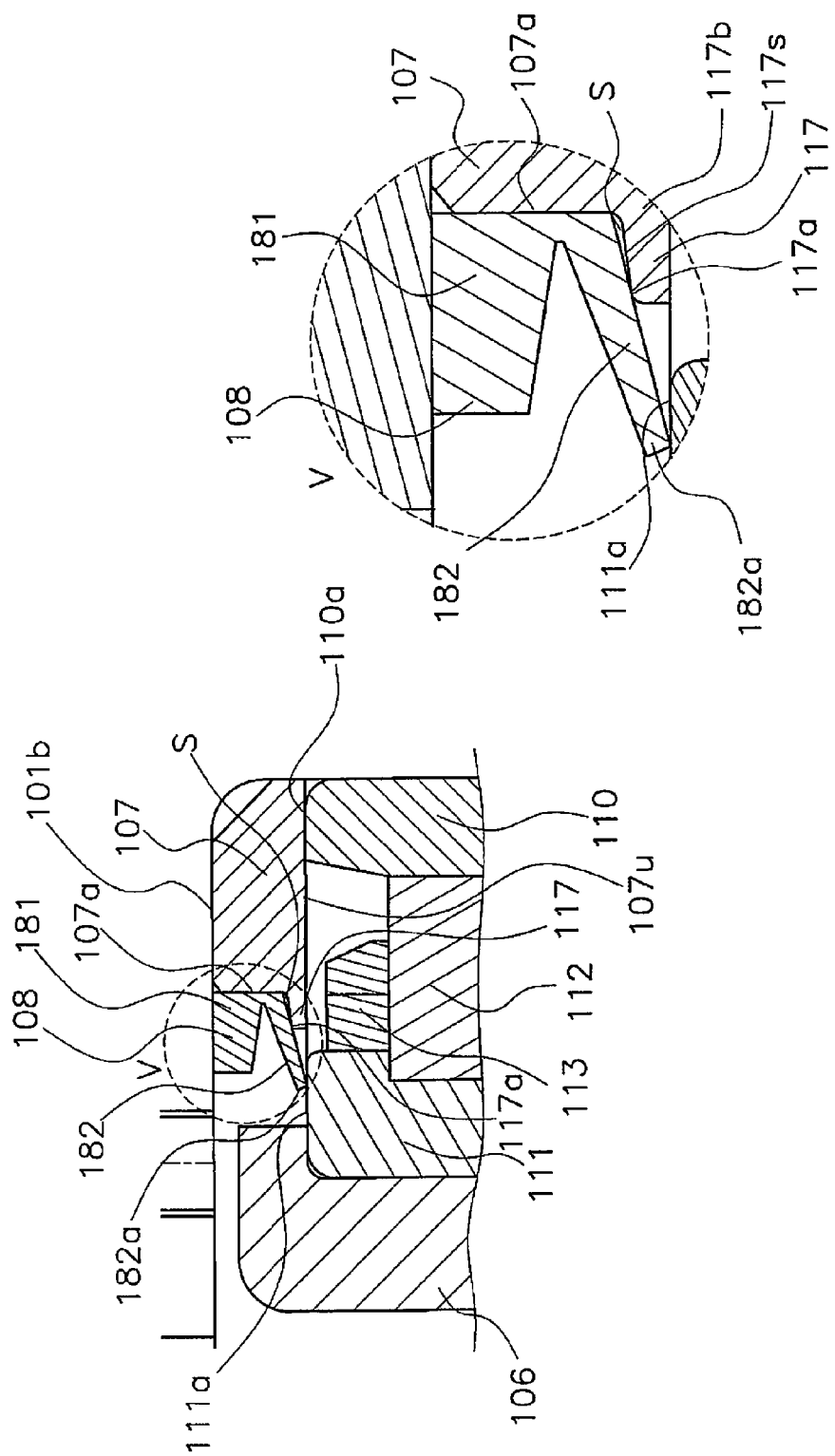
FIG. 6 is a detail view of the area marked W in FIG. 5.

FIG. 5 is a cross section of the area around the second bearing component 105. FIG. 6 is a detail view of the area marked W in FIG. 5. The second bearing component 105 has an inner race 110, an outer race 111, rollers 112, and a support 113 that supports the swing machinery rollers 112.

As shown in FIGS. 5 and 6, the inner race 110 is provided in contact with the second pinion shaft 103 around the second pinion shaft 103, and rotates along with the second pinion shaft 103.

As shown in FIGS. 5 and 6, the outer race 111 is disposed on the outside of the inner race 110, and is fixed to the case 106.

As shown in FIG. 6, the rollers 112 are rollably supported by the support 113 in between the inner race 110 and the outer race 111.

As shown in FIG. 6, the support ring 107 is disposed on the second pinion shaft 103 at a position between the upper end face 110a of the inner race 110 and the bottom face 101b of the output pinion 101, in contact with the upper end face 110a and the bottom face 101b. Providing the support ring 107 allows the output pinion 101 to be positioned above the height of the support ring 107 in the up and down direction from the inner race 110. This allows the output pinion 101 to be supported at a position above the case 106 so that it will not touch the case 106.

This support ring 107 rotates along with the second pinion shaft 103. A protrusion 117 that protrudes outward from the outer peripheral face 107a of the support ring 107 is provided to the lower end 107u of the support ring 107. The protrusion 117 is formed all the way around the support ring 107.

The seal member 108 is an elastic member formed from rubber or another such resin, and is mounted to the outer peripheral face 107a of the support ring 107 as shown in FIG. 6. More precisely, the seal member 108 has a cylindrical mounting component 181 mounted in contact with the outer peripheral face 107a of the support ring 107, and a lip component 182 formed protruding outward from the lower end of the mounting component 181. The lip component 182 is formed all the way around the seal member 108.

The mounting component 181 is mounted on the upper side of the protrusion 117 of the support ring 107. The lip component 182 protrudes more to the outside than the protrusion 117, is sloped downward, and its distal end 182a presses on the upper end face 111a of the outer race 111. The seal member 108 rotates simultaneously with the second pinion shaft 103 with the support ring 107.

As shown in FIG. 6, the lip component 182 comes into contact with the protrusion 117 at a contact portion 117a, and a space S is formed between the lip component 182 and the protrusion 117. More precisely, as shown in Detail V of FIG. 6, the contact portion 117a that comes into contact with the lip component 182 is formed on the upper side near the distal end of the protrusion 117 provided to the lower end 107u of the support ring 107. Also, the space S is formed between the lip component 182 and the upper side 117s of the protrusion 117 from the base portion 7b to the contact portion 117a.

The distal end 182a of the lip component 182 presses on the upper end face 111a of the outer race 111, so that the upper side of the second bearing component 105 is covered and sealed by the support ring 107 and the seal member 108, which prevents the scattering of grease and infiltration of foreign matter.

Method for Manufacturing Revolving Device

Figure 7:
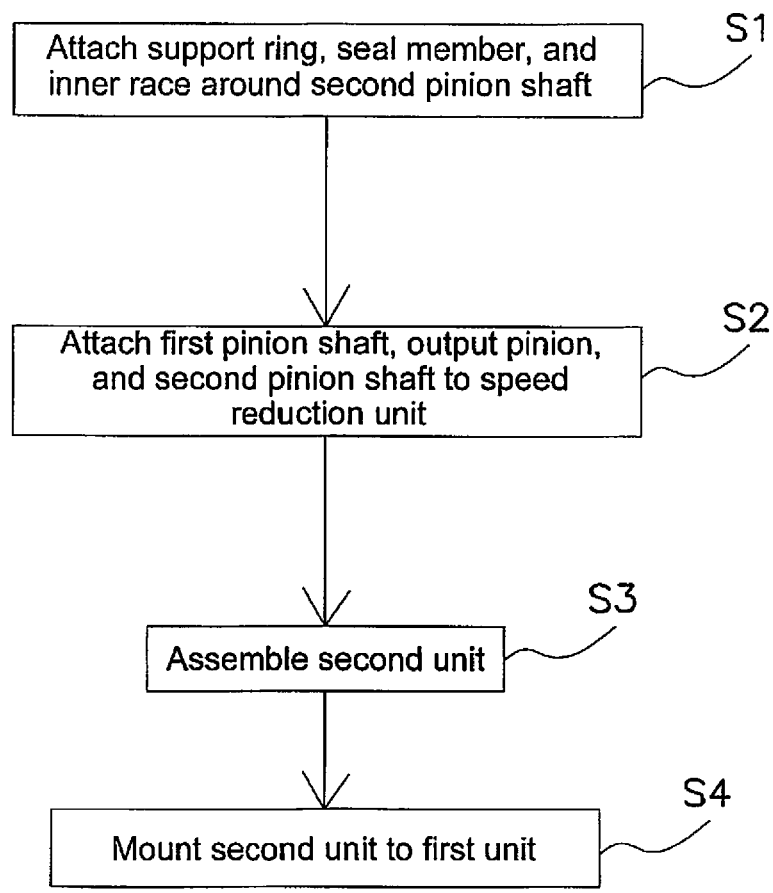
FIG. 7 is a flowchart of a method for manufacturing the revolving device shown in FIG. 4.
Figure 8:
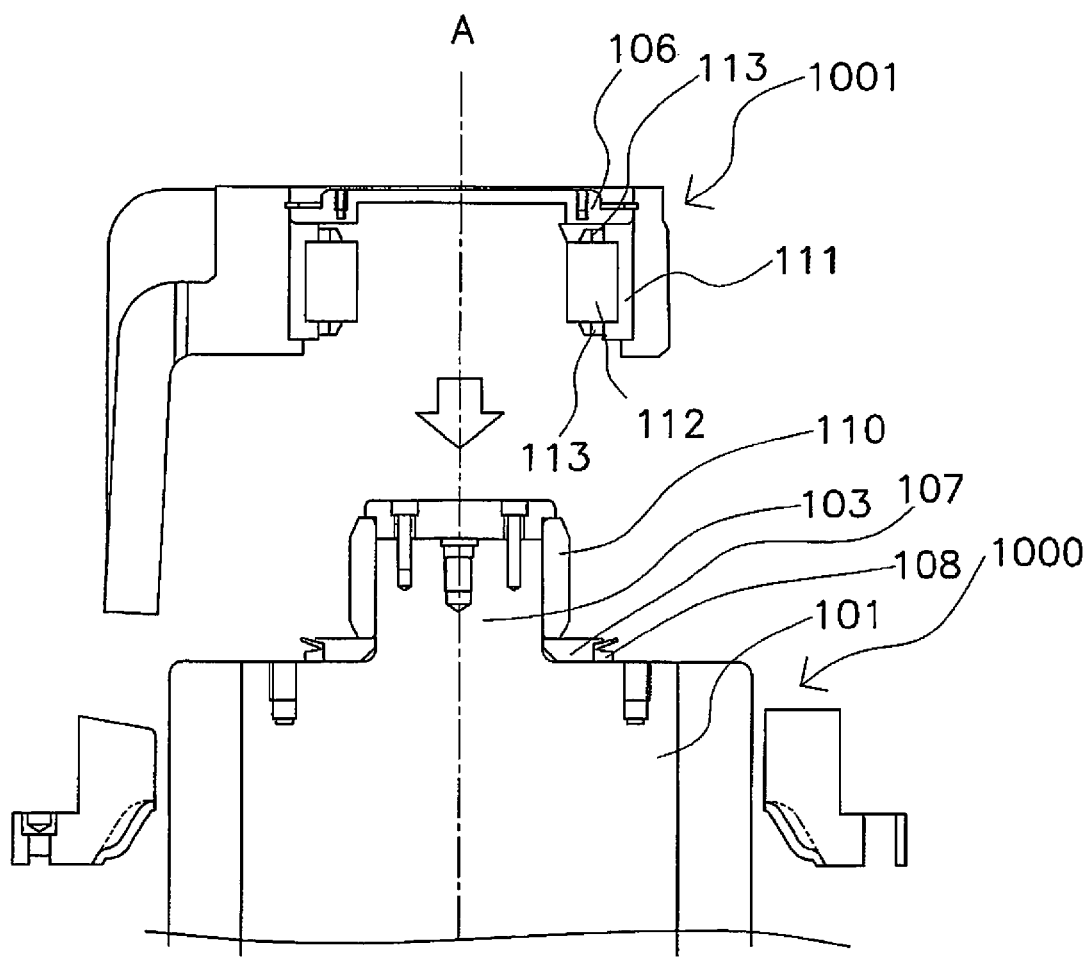
FIG. 8 is a diagram of the method for manufacturing the revolving device shown in FIG. 4.

Next, the method for manufacturing the revolving device of this exemplary embodiment will be described. FIG. 7 is a flowchart illustrating the method for manufacturing the revolving device of this exemplary embodiment. FIG. 8 is a diagram illustrating the method for manufacturing the revolving device of this embodiment. In FIG. 8, the various components of the revolving device are disposed upside-down, but the up and down direction mentioned in the following description is based on the layout during actual use. Specifically, the top in FIG. 8 is the bottom during use. The same applies to drawings showing a state of upside-down layout discussed below.

In the manufacture of the revolving device in this exemplary embodiment, a first unit 1000 and a second unit 1001 are assembled.

First, in the first step S1, the support ring 107, the seal member 108, and the inner race 110 are attached around the second pinion shaft 103. The seal member 108 is mounted to the outer peripheral face 107a of the support ring 107 before or after the support ring 107 is attached to the second pinion shaft 103. The inner race 110 is then attached to the second pinion shaft 103 to come into contact with the support ring 107.

Next, in the second step S2, the first pinion shaft 102, the output pinion 101, and the second pinion shaft 103 are attached to the speed reduction unit 16. In this attachment, the speed reduction unit 16 is disposed upside-down, and the first pinion shat 102, the output pinion 101, and second pinion shaft 103 are attached from above the speed reduction unit 16.

The result of the first step S1 and the second step S2 is the assembly of the first unit 1000 having the speed reduction unit 16, the first pinion shaft 102, the output pinion 101, the second pinion shaft 103, the support ring 107, the seal member 108, and the inner race 110 (see FIG. 8).

Next, in the third step S3, the second unit 1001 is assembled, in which the outer race 111, the rollers 12, and the support 113 are attached to the case 106.

Next, in the fourth step S4, the second unit 1001 is mounted to the first unit 1000 from above. As shown in FIG. 8, the first unit 1000 is disposed upside-down, and the second pinion shaft 103 protrudes upward. The second unit 1001 is also disposed upside-down, and is mounted to the first unit 1000 so that the outer race 111 will be disposed around the inner race 110 attached to the second pinion shaft 103. As shown in FIG. 8, the second unit 1001 is moved from above to below in a state in which the center axis of the inner race 110 (see A in the drawing) substantially coincides with the center axis of the outer race 111 (see A in the drawing).

Figure 9:
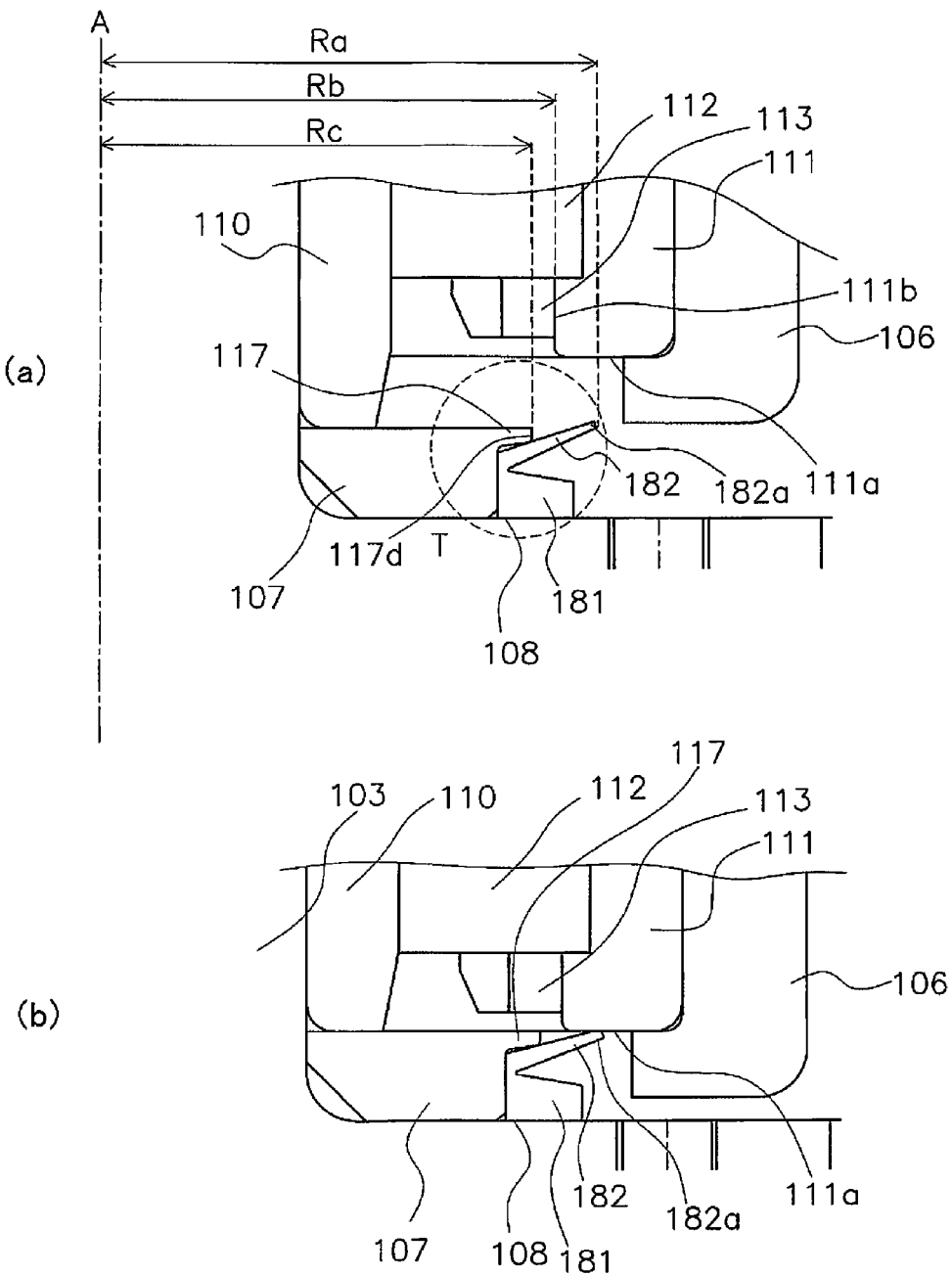
FIGS. 9a and 9b are diagrams of the method for manufacturing the revolving device shown in FIG. 4.

FIG. 9a is a diagram of the state of the seal member 108 before the second unit 1001 is mounted to the first unit 1000. FIG. 9b is a diagram of the state of the seal member 108 after the second unit 1001 has been mounted to the first unit 1000. FIG. 10a is a detail view of the area marked T in FIG. 9a, and FIG. 10b is a cross section of the state of the seal member 108 before attachment to the support ring 107.

Figure 10:
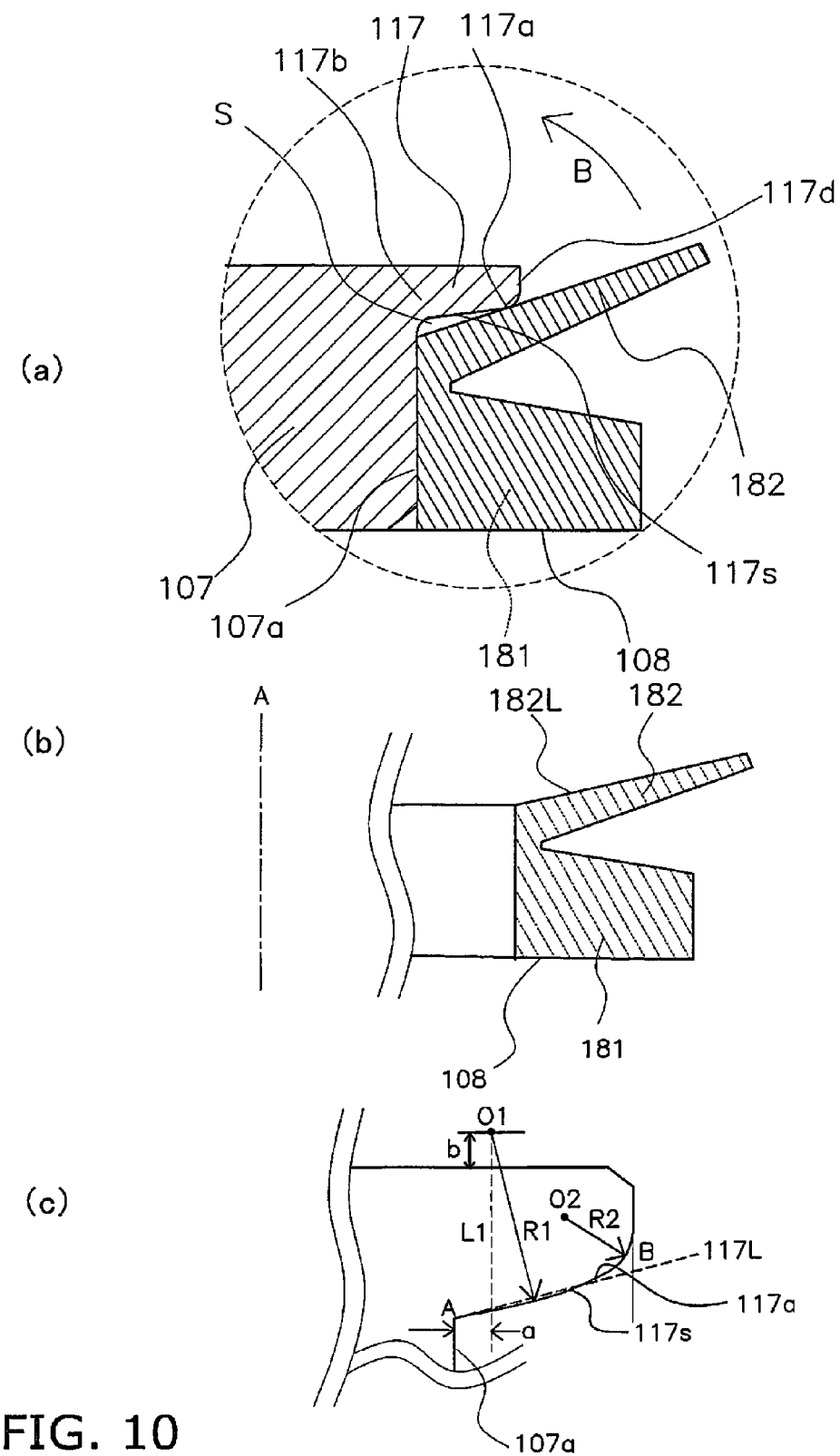
FIG. 10a is a detailed view of the area marked T in FIG. 9a, FIG. 10b is a detailed view of the seal member.
FIG. 10c is a detailed view of the protrusion.

As shown in FIG. 10b, the lip component 182 of the seal member 108 protrudes at an angle, facing downward with respect to the vertical direction of the center axis A of the seal member 108. When this seal member 108 is attached to the support ring 107, as shown in FIG. 10a, it undergoes elastic deformation, and the lip component 182 moves further at an angle so that its distal end 182a approaches the center axis A side (see the arrow B). This movement is stopped when the lip component 182 hits the protrusion 117. In the state in FIGS. 9 and 10, the support ring 107 and the seal member 108 are disposed upside-down, but as mentioned above, to describe this based on the up and down direction in normal use, the contact portion 117a with which the lip component 182 comes into contact is formed on the upper side near the distal end of the protrusion 17 provided to the lower end of the support ring 107, just as in the state in FIG. 6. Also, the space S is formed between the lip component 182 and the upper side 117s from the base portion 117b of the protrusion 117 to the contact portion 117a.

Thus attaching the seal member 108 to the support ring 107 so that the space S is provided between the two and so that the lip component 182 comes into contact with the protrusion 117 makes it easier to adjust the position of the distal end 182a of the lip component 182 than when the lip component 182 is disposed to conform to the upper side 117s of the protrusion 117.

Also, with this contact portion 117a, the surface of the protrusion 117 is rounded off in two stages, and is formed to not scratch the lip component 182. More precisely, as shown in the detail view in FIG. 10c, the upper side 117s of the protrusion 117 is formed in a straight line for a specific length (indicated by a in the drawing) in a direction perpendicular to the outer peripheral face 107a, from the outer peripheral face 107a (in front view), and from there is formed in a curved shape with a radius R1, and then in a curved shape with a radius R2.

The center position O1 of R1 is a position that lies on a line L1 that is perpendicular to the lower end face 117v of the protrusion 117 from a position that has moved by a specific length a from the outer peripheral face 107a in a direction perpendicular to the outer peripheral face 107a and the center O1 of R1 is a position that has moved downward by a length b from the lower end face 117v on the Line L1.

The contact portion 117a with which the lip component 182 comes into contact is located near the portion where there is a transition from R1 to R2. R1 has a larger diameter than R2.

Let us now look at the center position O2 of R2. The center position O2 is provided so as to be tangent to the straight line 117L shown in FIG. 10c.

To describe this in more detail, the intersection between the outer peripheral face 107a of the support ring 107 and the upper side 117s of the protrusion 117 is indicated by A in FIG. 10c. As shown in FIG. 10b, 182L is a straight line on the lower end side of the lip component 182 of the seal member 108 in a state of not being attached to the support ring 107. 117L is a straight line that passes through A and has the slope of the straight line 182L. The center position O2 of a circle with a radius of R2 is provided to be tangent to this straight line 117L. The intersection between the straight line 117L and the extension line of the distal end 117d is indicated by B.

In the state in FIG. 10a, that is, in a state in which the seal member 108 has been assembled to the support ring 107 and the lip component 182 is in contact with the protrusion 117, as shown in FIG. 9a, the radius Ra of the distal end 182a of the lip component 182 is longer than the radius Rc of the distal end 117d of the protrusion 117, and is longer than the inside diameter Rb of the outer race 111 (the inner peripheral face is indicated as 111b).

Therefore, as shown in FIG. 8, in a state in which the center axis of the inner race 110 substantially coincides with the center axis of the outer race 111, the position of the distal end 182a of the lip component 182 is further outside than the inner peripheral face 111b of the outer race 111, and under the upper end face 111a, as shown in FIG. 9a.

In this state, the second unit 1001 is moved downward, the distal end 182a of the lip component 182 hits the upper end face 111a of the outer race 111, which seals the upper side of the second bearing component 105. In this fourth step S4, as shown in FIGS. 9a and 9b, because the case 106 is disposed on the outside of the seal member 108, the sealing state of the seal member 108 is hard to check visually, but in this exemplary embodiment, the distal end of the lip component 182 is disposed at a position opposite the upper end face 111a of the outer race 111, so good sealing performance can be ensured even though a visual check is impossible.

As illustrated in FIG. 6, with the revolving device 10 in its manufactured state, the lip component 182 comes into contact with the protrusion 117 at the contact portion 117a, and the space S is formed between the lip component 182 and the protrusion 117.

Features

The revolving device 10 for a work vehicle in this exemplary embodiment comprises the driving apparatus 11, the speed reduction unit 16, the output pinion 101, the first pinion shaft 102, the second pinion shaft 103, the second bearing component 105 (an example of a bearing component), the case 106, the support ring 107, and the seal member 108. The speed reduction unit 16 is disposed under the driving apparatus 11 and reduces the speed of rotation of the driving apparatus 11. The output pinion 101 is disposed under the speed reduction unit 16 and outputs the rotation of the driving apparatus 11 reduced by the speed reduction unit 16. The first pinion shaft 102 is provided facing upward from the top face 101a of the output pinion 101. The second pinion shaft 103 is provided facing downward from the bottom face 101b of the output pinion. The second bearing component 105 rotatably supports the second pinion shaft 103. The case 106 is provided to cover the lower side and the surrounding area of the second bearing component 105. The support ring 107 is disposed on the second pinion shaft at a position between the output pinion 101 and the second bearing component 105, and comes into contact with the second bearing component 105 and the output pinion 101 to support the output pinion 101 above the second bearing component 105. The seal member 108 has the mounting component 181 disposed on the outer peripheral face 107a of the support ring 107, and the lip component 182 that is formed protruding outward in the radial direction from the mounting component 181 and seals the upper side of the second bearing component 105. The support ring 107 has the protrusion 117 provided protruding outward in the radial direction from the lower end 107u of the support ring 107. The mounting component 181 is disposed higher than the protrusion 117, and the lip component 182 protrudes more to the outside than the protrusion 117.

In the manufacture of the revolving device 10 for a work vehicle, the seal member 108 is fitted around the outside of the support ring 107, but because the seal member 108 is elastic, it may undergo elastic deformation, causing the angle of the lip component 182 to change.

Figure 11:
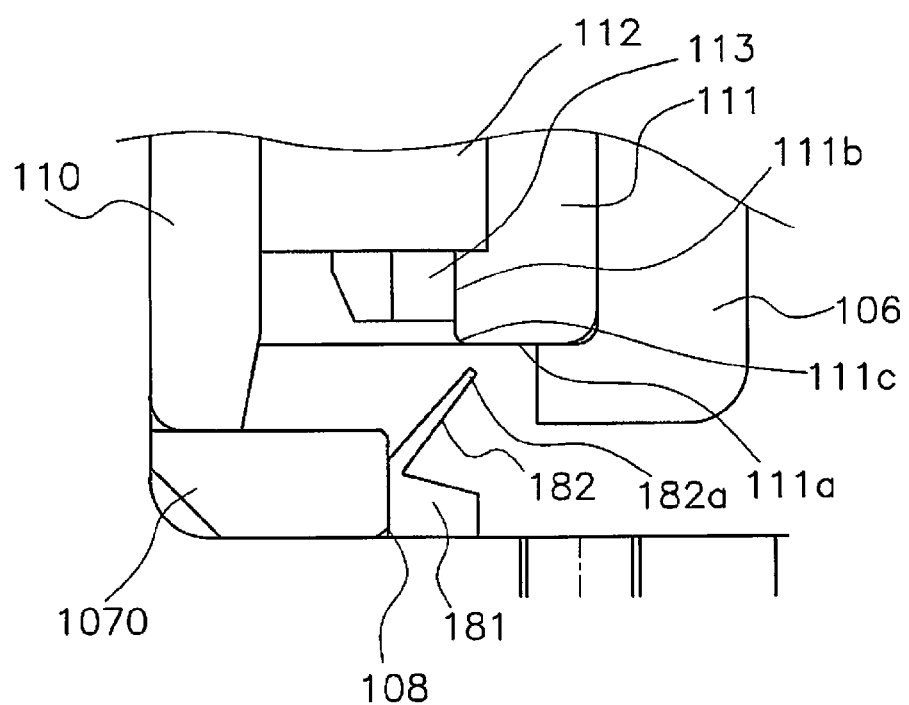
FIG. 11 is a diagram of a state in which the seal member has been attached to the support ring when no protrusion is provided.

For example, FIG. 11 shows a state in which the second unit 1001 is mounted to the first unit 1000, when using a support ring 1070 on which no protrusion 117 is formed. As shown in FIG. 11, because no protrusion 117 is formed, the lip component 182 moves upward too far because of elastic deformation, so the distal end 182a of the lip component 182 is opposite the area near the end 111c of the outer race 111 on the inner peripheral face 111b side of the upper end face 111a, and therefore may not readily come into contact with the upper end face 111a of the outer race 111.

However, providing the protrusion 117 as above reduces the change in angle because the lip component 182 hits the protrusion 117, even though there is a change in the angle of the lip component 182.

Accordingly, even though the case 106 makes visual inspection impossible, the lip component 182 of the seal member 108 can still be disposed in the proper position (the upper end face 111a).

This allows good sealing performance to be ensured more reliably.

With the revolving device 10 for a work vehicle in this exemplary embodiment, the second bearing component 105 has the inner race 110 (an example of an inner ring), the outer race 111 (an example of an outer ring), and the rollers 112 (an example of a rolling body). The outer race 111 is disposed on the outer peripheral side of the inner race 110, and fixed to the case 106. The rollers 112 are rollably disposed between the inner race 110 and the outer race 111. The lip component 182 comes into contact with the upper end face 111a of the outer race 111.

Because the lip component 182 of the seal member 108 thus comes into contact with the upper end face 111a of the outer race 111, the seal member 108 can cover and seal the upper side of the second bearing component 105, and particularly above the area between the outer race 111 and the inner race 110, which prevents the scattering of grease and infiltration of foreign matter.

With the revolving device 10 for a work vehicle in this exemplary embodiment, the protrusion 117 is provided all the way around the support ring 107.

Consequently, a change in the angle of the lip component 182 caused by fitting the seal member 108 to the support ring 107 can be suppressed more reliably, and the position sealed by the lip component 182 can be set in the proper position.

The method for manufacturing the revolving device 10 for a work vehicle in this exemplary embodiment comprises first and second steps S1 and S2 (an example of the first unit assembly step), a third step S3 (an example of the second unit assembly step), and a fourth step (an example of the mounting step). The first step S1 and the second step S2 involve assembling the first unit 1000 having the speed reduction unit 16, the first pinion shaft 102, the output pinion 101, the second pinion shaft 103, the support ring 107, the seal member 108, and the inner race 110. In the first step S1 (an example of a first attachment operation), the support ring 107, the seal member 108, and the inner race 110 are attached around the second pinion shaft 103. In the second step S2 (an example of a second attachment operation), the first pinion shaft 102, the output pinion 101, and the second pinion shaft 103 are attached to the speed reduction unit 16. In the third step S3, the second unit 1001 is assembled by attaching the outer race Iii and the rollers 112 to the case 106. In the fourth step S4, the second unit 1001 is mounted from the upper side of the first unit 1000, which is disposed upside-down, so that the outer race 111 will be disposed on the outside of the inner race 110. The diameter Rc of the distal end 117d of the protrusion 117 is smaller than the inside diameter Rb of the outer race 11, and the diameter Ra of the distal end 182a of the lip component 182 is larger than the inside diameter Rb of the outer race 111 in a state of having been attached around the support ring 107.

Thus, in a state in which the seal member 108 has been attached around the support ring 107, even when there is a change in the angle of the lip component 182, the lip component 182 will hit the protrusion 117, which suppresses a change in the angle, so the radius Ra of the distal end 182a of the lip component 182 is larger than the inside diameter Rb of the outer race 111. Accordingly, in the fourth step S4, even though the case 106 precludes visual inspection of the contact state of the seal member 108, the lip component 182 can more reliably be brought into contact with the upper end face 111a of the outer race 111, which ensures good sealing performance.

OTHER EXEMPLARY EMBODIMENTS

An exemplary embodiment of the present invention was described above, but the present invention is not limited to or by the above exemplary embodiment, and various modifications are possible without departing from the gist of the invention.

Figure 12:
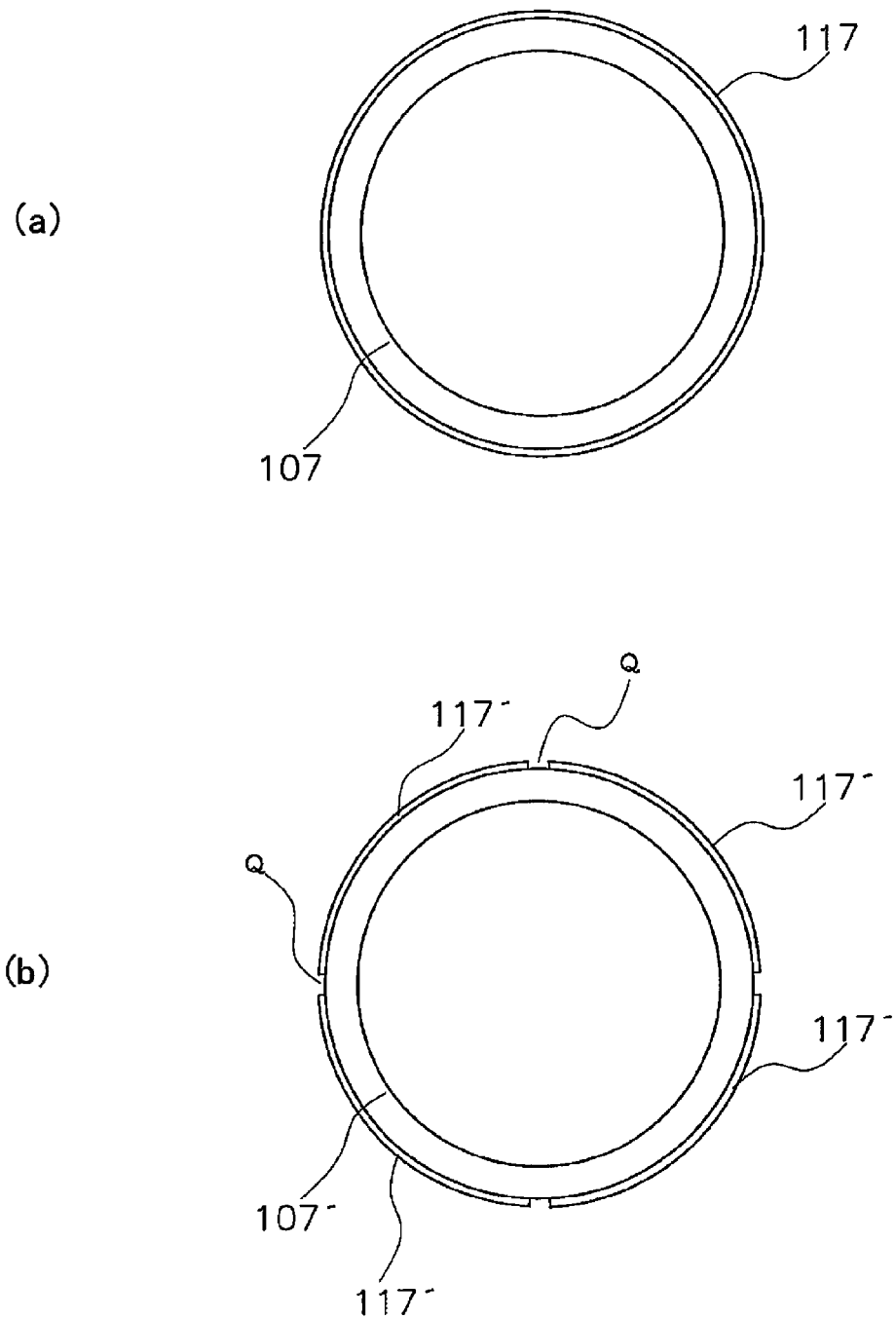
FIG. 12a is a plan view of the support ring in an exemplary embodiment pertaining to the present invention.
FIG. 12b is a plan view of the support ring in another exemplary embodiment pertaining to the present invention.

With the support ring 107 in the above exemplary embodiment, the protrusion 117 was provided all the way around the support ring 107 as shown in FIG. 12a, but need not be provided all the way around.

For example, as with the support ring 107 in FIG. 12b, the protrusion may be divided up into a plurality of protrusions 117', and spaces Q may be formed in between the protrusions 117'.

Figure 13:
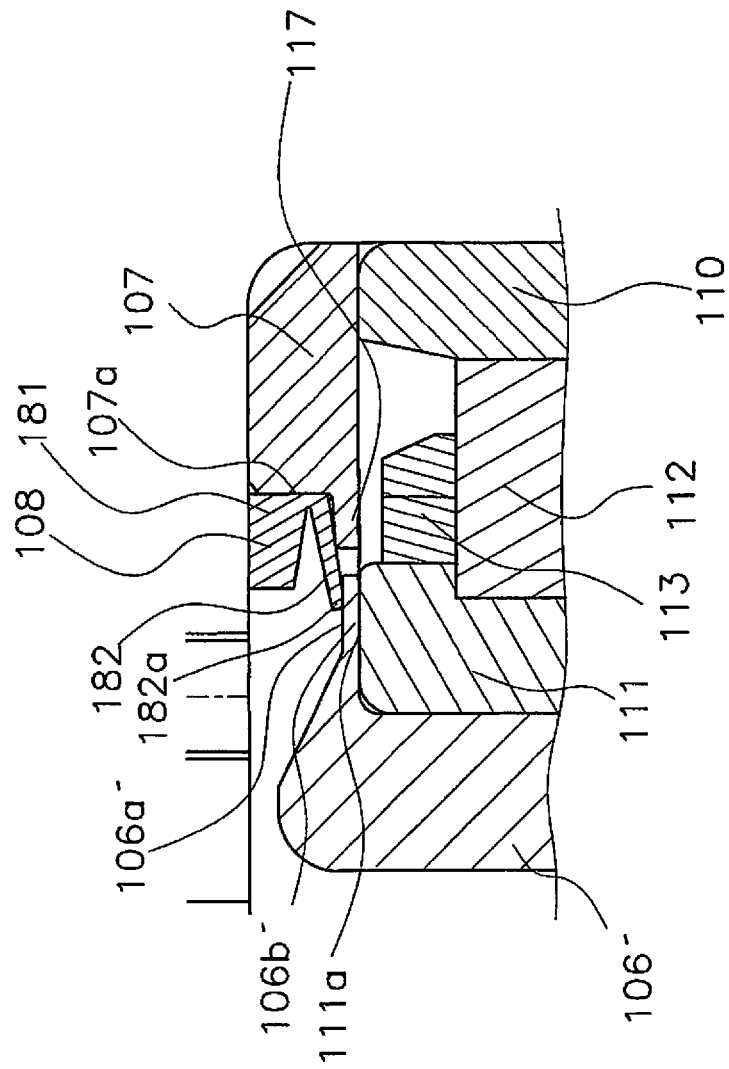
FIG. 13 is a diagram of the revolving device in another exemplary embodiment pertaining to the present invention.

In the above exemplary embodiment, the distal end 182a of the lip component 182 of the seal member 108 came into contact with the upper end face 111a of the outer race 11, but may instead come into contact with something other than the upper end face 111a of the outer race 111. As shown in FIG. 13, for example, if a case 106' has an overhang 106b' that extends to the outer race 111 side, then the distal end 182a of the lip component 182 may come into contact with the top face 106a' of this extended overhang 106b'.

Here again, this prevents the scattering of grease from the second bearing component 105 and the infiltration of foreign matter into the second bearing component 105.

In the above exemplary embodiment, teeth were formed on the outside of the swing circle 21, and the revolving device 10 rotated on the outside of the swing circle 21, but the configuration may instead be such that teeth are formed on the inside of the swing circle 21, and the revolving device 10 rotates on the inside of the swing circle 21.

In the above exemplary embodiment, the second step S2 was performed after the first step S1, but the second step S2 may instead be performed before the first step S1. Specifically, the support ring 107, the seal member 108, and the inner race 110 may be attached to the second pinion shaft 103 after the first pinion shaft 102, the output pinion 101, and the second pinion shaft 103 have been attached to the speed reduction unit 16.

In the above exemplary embodiment, the lip component 182 came into contact with the protrusion 117 both in the state of the revolving device 10 prior to manufacture (see FIG. 10a) and the state after manufacture (see FIG. 6), but the lip component 182 need not come into contact with the protrusion 117 in the state after manufacture.

In the above exemplary embodiment, a revolving device for a hydraulic excavator was described as an example, but the present invention is not limited to this, and can also be applied to any work vehicle having a revolving device on a chassis, and not just a hydraulic excavator.

The revolving device for a work vehicle pertaining to exemplary embodiments of the present invention has the effect of ensuring good sealing performance more reliably, and therefore can be widely applied to the revolving devices of various kinds of work vehicle.

The invention claimed is:

1. A revolving device for a work vehicle, comprising:
   a driving apparatus that generates a rotational drive force for revolution;
   a speed reduction unit that is disposed under the driving apparatus and reduces the speed of rotation of the driving apparatus;
   an output pinion that is disposed under the speed reduction unit and outputs the rotation of the driving apparatus reduced by the speed reduction unit;
   a first pinion shaft that is provided facing upward from the top face of the output pinion and transmits the rotation of the driving apparatus through the speed reduction unit;
   a second pinion shaft that is provided facing downward from the bottom face of the output pinion;
   a bearing component that rotatably supports the second pinion shaft;
   a case that is provided to cover the lower side and an outer circumferential surface of the bearing component;
   a support ring disposed on the second pinion shaft at a position between the output pinion and the bearing component, and that comes into contact with the bearing component and the output pinion to support the output pinion above the bearing component; and
   a seal member that has a mounting component disposed around the outside of the support ring, and a lip component formed protruding outward in the radial direction from the mounting component and seals the upper side of the bearing component,
   wherein the support ring has a protrusion provided protruding outward in the radial direction from the lower end of the support ring, and
   the mounting component is disposed higher than the protrusion, and the lip component protrudes more to the outside than the protrusion.

2. The revolving device for a work vehicle according to claim 1, wherein
   the bearing component has
   an inner ring that comes into contact with the second pinion shaft and rotates along with the second pinion shaft;
   an outer ring that is disposed on the outer peripheral side of the inner ring and is fixed to the case; and
   a rolling body that is disposed rollably between the inner ring and the outer ring, and
   the lip component comes into contact with the upper end face of the outer ring.

3. The revolving device for a work vehicle according to claim 1,
   wherein the protrusion extends around an entire outer circumference of the support ring.

4. A method for manufacturing the revolving device for a work vehicle according to claim 2, comprising:
   a first unit assembly step of assembling a first unit, which has the speed reduction unit, the first pinion shaft, the output pinion, the second pinion shaft, the support ring, the seal member, and the inner ring, having a first attachment operation in which the support ring, the seal member, and the inner ring are attached around the second pinion shaft, and a second attachment operation in which the first pinion shaft, the output pinion, and the second pinion shaft are attached to the speed reduction unit;
   a second unit assembly step of assembling a second unit by attaching the outer ring and the rolling body to the case; and
   a mounting step of mounting the second unit, which is disposed upside-down, from the upper side of the first unit, which is disposed upside-down, so that the outer ring is disposed on the outside of the inner ring,
   wherein the diameter of the distal end of the protrusion is smaller than the inside diameter of the outer ring, and the diameter of the distal end of the lip component is larger than the inside diameter of the outer ring in a state of having been attached around the support ring, prior to the mounting of the second unit to the first unit.

5. The revolving device for a work vehicle according to claim 1, wherein
   a portion of the lip component of the seal member is disposed between the mounting component of the seal member and the support ring protrusion in an axial direction of the second pinion shaft.

* * * * *